United States Patent
Chou (10) Patent No.: US 9,620,125 B2
(45) Date of Patent: Apr. 11, 2017

(54) METHOD OF PROVIDING INPUT METHOD AND ELECTRONIC DEVICE USING THE SAME

(71) Applicant: Wistron Corporation, New Taipei (TW)

(72) Inventor: Hui-Ying Chou, New Taipei (TW)

(73) Assignee: Wistron Corporation, New Taipei (TW)

( * ) Notice: Subject to any disclaimer, the term of this patent is extended or adjusted under 35 U.S.C. 154(b) by 154 days.

(21) Appl. No.: 14/320,650

(22) Filed: Jul. 1, 2014

(65) Prior Publication Data

US 2015/0187358 A1    Jul. 2, 2015

(30) Foreign Application Priority Data

Dec. 27, 2013    (TW) .............................. 102148806 A (51) Int. Cl.
| | |
|---|---|
| *G10L 21/00* | (2013.01) |
| *G10L 25/00* | (2013.01) |
| *G10L 17/22* | (2013.01) |
| *G06F 3/023* | (2006.01) |
| *G06F 17/27* | (2006.01) |
| *G06F 17/20* | (2006.01) |
| *G06F 17/22* | (2006.01) |

(52) U.S. Cl.
CPC ............ *G10L 17/22* (2013.01); *G06F 3/0237* (2013.01); *G06F 17/275* (2013.01); *G06F 17/2223* (2013.01)

(58) Field of Classification Search
CPC ........ G10L 15/005; G10L 15/22; G10L 17/22
USPC .............................. 704/9, 200, 247, 251, 275
See application file for complete search history.

(56) References Cited

U.S. PATENT DOCUMENTS

| | | | | |
|---|---|---|---|---|
| 6,002,998 | A | * 12/1999 | Martino | ................ G06F 17/275 704/1 |
| 2008/0114598 | A1 | * 5/2008 | Prieto | ..................... G10L 15/10 704/254 |

(Continued)

FOREIGN PATENT DOCUMENTS

| | | |
|---|---|---|
| CN | 101957846 B | 7/2012 |
| TW | I323117 | 4/2010 |
| TW | 201117055 | 5/2011 |

OTHER PUBLICATIONS

Office action mailed on Jul. 23, 2015 for the Taiwan application No. 102148806, filing date: Dec. 27, 2013, p. 1 line 12~14, p. 2~5 and p. 6 line 1~6.

*Primary Examiner* — Thierry L Pham
(74) *Attorney, Agent, or Firm* — Winston Hsu; Scott Margo (57) ABSTRACT

A method of providing an input method for an electronic device includes receiving a command for switching a display image of the electronic device; determining whether at least two words correspond to at least two languages when at least the two words are in the display image; determining a word count of a first language and a word count of a second language when the two words correspond to the two languages; and enabling a first input method corresponding to the first language when the word count of the first language is greater than the word count of the second language, or enabling a second input method corresponding to the second language when the word count of the second language is greater than the word count of the first language.

24 Claims, 5 Drawing Sheets

(56) References Cited

U.S. PATENT DOCUMENTS

| | | | |
|---|---|---|---|
| 2011/0115707 A1* | 5/2011 | Zhang | G06F 3/018 345/163 |
| 2014/0122513 A1* | 5/2014 | Julia | G06F 17/30746 707/758 |
| 2016/0155435 A1* | 6/2016 | Mohideen | G08G 5/0013 704/235 |

* cited by examiner

METHOD OF PROVIDING INPUT METHOD AND ELECTRONIC DEVICE USING THE SAME

BACKGROUND OF THE INVENTION

1. Field of the Invention

The present disclosure relates to a method of providing an input method and an electronic device using the same, and more particularly, to a method capable of automatically enabling a proper input method and an electronic device using the same.

2. Description of the Prior Art

In the modern international society, people require an electronic device which can support multiple languages. To fulfill this requirement, most commercially available electronic devices (such as personal digital assistants (PDAs), smart phones, desktops, notebooks and tablets) are equipped with input methods corresponding to various languages/words. The user can therefore switch to their desired input language in the electronic device according to personal requirements.

In several situations, a user may need to input words in different languages in different windows, or for different applications: for example, when sending emails to different countries, chatting with different people in different chat windows, or editing articles of different languages. When switching between different windows or applications in the electronic device, the user must manually enable their desired input method, which is inconvenient. In addition, a user may forget to switch the input method when switching between windows, such that they begin inputting words using the wrong input method. Having to delete errors and then input the desired words again causes more wasted time. Thus, there is a need to provide a method of adaptively and automatically switching the input method, wherein the method can determine in which languages the user needs to input words, and then enable a corresponding input method.

SUMMARY OF THE INVENTION

It is therefore an objective of the present disclosure to provide a method capable of determining in which language a user needs to input words and enabling a corresponding input method, and an electronic device using the same.

The present disclosure discloses a method of providing an input method for an electronic device. The method comprises receiving a command for switching a display image of the electronic device; determining whether at least two words correspond to at least two languages when at least the two words are in the display image; determining a word count of a first language and a word count of a second language when the two words correspond to the two languages; and enabling a first input method corresponding to the first language when the word count of the first language is greater than the word count of the second language, or enabling a second input method corresponding to the second language when the word count of the second language is greater than the word count of the first language.

The present disclosure further discloses an electronic device. The electronic device comprises a display, a processing unit, an input unit, and a storage unit. The input unit, coupled to the display and the processing unit, is utilized for receiving a command for switching a display image on the display. The storage unit, coupled to the display and the processing unit, is utilized for storing a program executed by the processing unit for performing the following steps: determining whether at least two words correspond to at least two languages when at least the two words are in the display image; determining a word count of a first language and a word count of a second language when the two words correspond to the two languages; and enabling a first input method corresponding to the first language when the word count of the first language is greater than the word count of the second language, or enabling a second input method corresponding to the second language when the word count of the second language is greater than the word count of the first language.

The present disclosure further discloses a non-transitory computer-readable medium embodying a program executable in an electronic device for instructing a processor to perform a method of providing an input method. The program comprises code for receiving a command for switching a display image of the electronic device; code for determining whether at least two words correspond to at least two languages when at least the two words are in the display image; code for determining a word count of a first language and a word count of a second language when the two words correspond to the two languages; and code for enabling a first input method corresponding to the first language when the word count of the first language is greater than the word count of the second language, and code for enabling a second input method corresponding to the second language when the word count of the second language is greater than the word count of the first language.

These and other objectives of the present disclosure will no doubt become obvious to those of ordinary skill in the art after reading the following detailed description of the preferred embodiment that is illustrated in the various figures and drawings.

DETAILED DESCRIPTION

Figure 1:
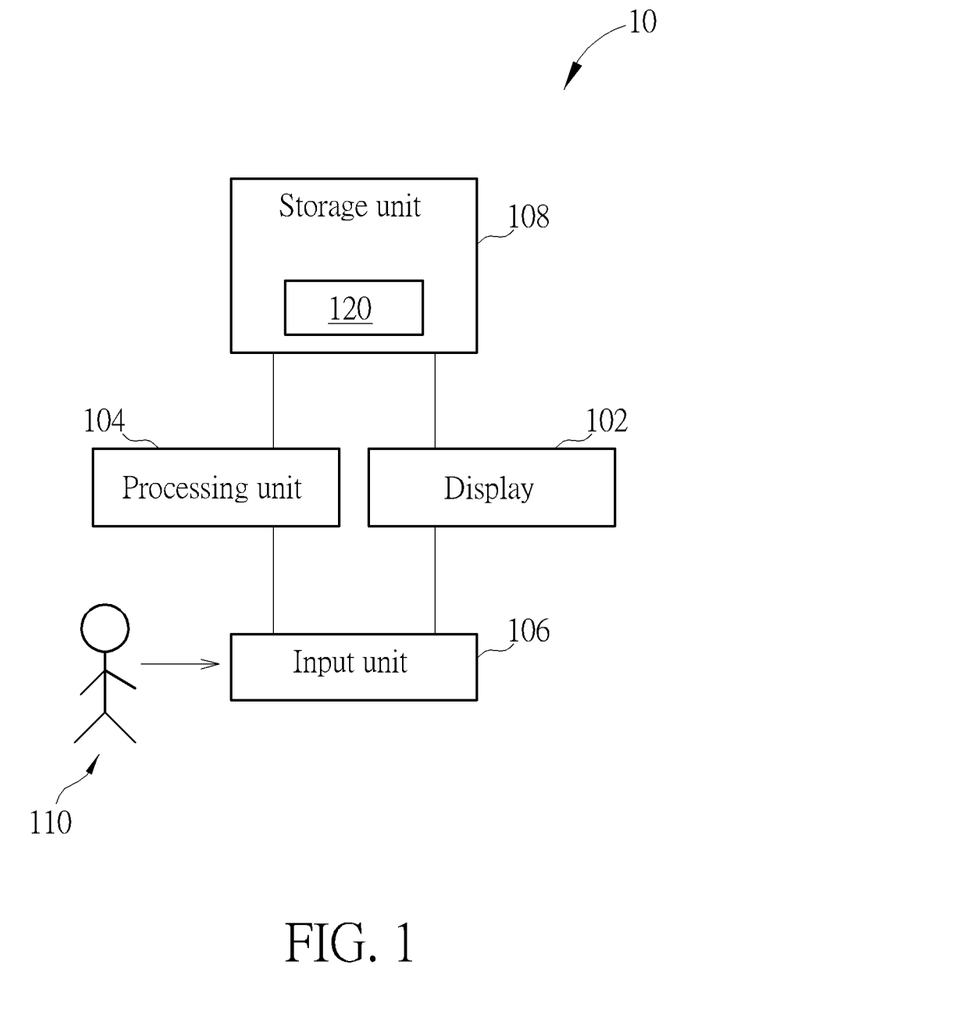
FIG. 1 is a schematic diagram of an electronic device according to an embodiment of the present disclosure.

Please refer to FIG. 1, which is a schematic diagram of an electronic device 10 according to an embodiment of the present disclosure. As shown in FIG. 1, the electronic device 10 includes a display 102, a processing unit 104, an input unit 106 and a storage unit 108. The display 102 may be any device having image displaying functions such as a liquid crystal display (LCD), plasma display panel (PDP) or organic light-emitting diode (OLED) display. The processing unit 104 may be a central processing unit (CPU), microprocessor or other types of processors which may be used in the electronic device 10. The input unit 106, coupled to the display 102 and the processing unit 104, is utilized for receiving a command from a user 110 to switch display images on the display 102. The input unit 106 may include any devices allowing the user 110 to input the command, such as a keyboard, mouse or touch screen, etc. The storage unit 108, coupled to the display 102 and the processing unit 104, is utilized for storing a program 120 to control the processing unit 104 to determine whether there is a word in a display image when the display 102 is switched to show the display image. If there are words in the display image, the program 120 further controls the processing unit 104 to determine the word count of different languages. After a language having the highest word count is found, the processing unit 104 enables an input method corresponding to the language having the highest word count. The storage unit 108 is further utilized for storing input methods corresponding to different languages. The storage unit 108 may include, but should not be limited to, any type of memory such as a random access memory (RAM), read-only memory (ROM), and flash drive.

In detail, in a display image (such as a window, an application or a dialog box), the user 110 may use a main input method for performing input; hence, the language having the highest word count in the display image usually corresponds to the input method of the user 110. For example, the languages/words used by the user 110 may include English and traditional Chinese, which may respectively be inputted via an English/numeral input method and a phonetic symbol input method. When the display image on the display 102 is switched, the processing unit 104 may determine whether there is a word in the updated display image. If there are words in the display image, the processing unit 104 may determine whether these words include both English words and traditional Chinese words. When the words in the display image include both English words and traditional Chinese words, the processing unit 104 may further determine the word count of the English words and the word count of the traditional Chinese words. When the English word count is determined to be greater than the traditional Chinese word count, the processing unit 104 may consider that the input method required by the user 110 is the English/numeral input method, and thus automatically enables the English/numeral input method for the user 110 to perform input. When the traditional Chinese word count is determined to be greater than the English word count, the processing unit 104 may consider that the input method required by the user 110 is the phonetic symbol input method, and thus automatically enable the phonetic symbol input method for the user 110 to perform input. In addition, when all words in the display image are English words, the processing unit 104 may directly enable the English/numeral input method; when all words in the display image are traditional Chinese words, the processing unit 104 may directly enable the phonetic symbol input method. As a result, the user will not waste time inputting incorrect words when they forget to switch the input method.

Figure 2A:
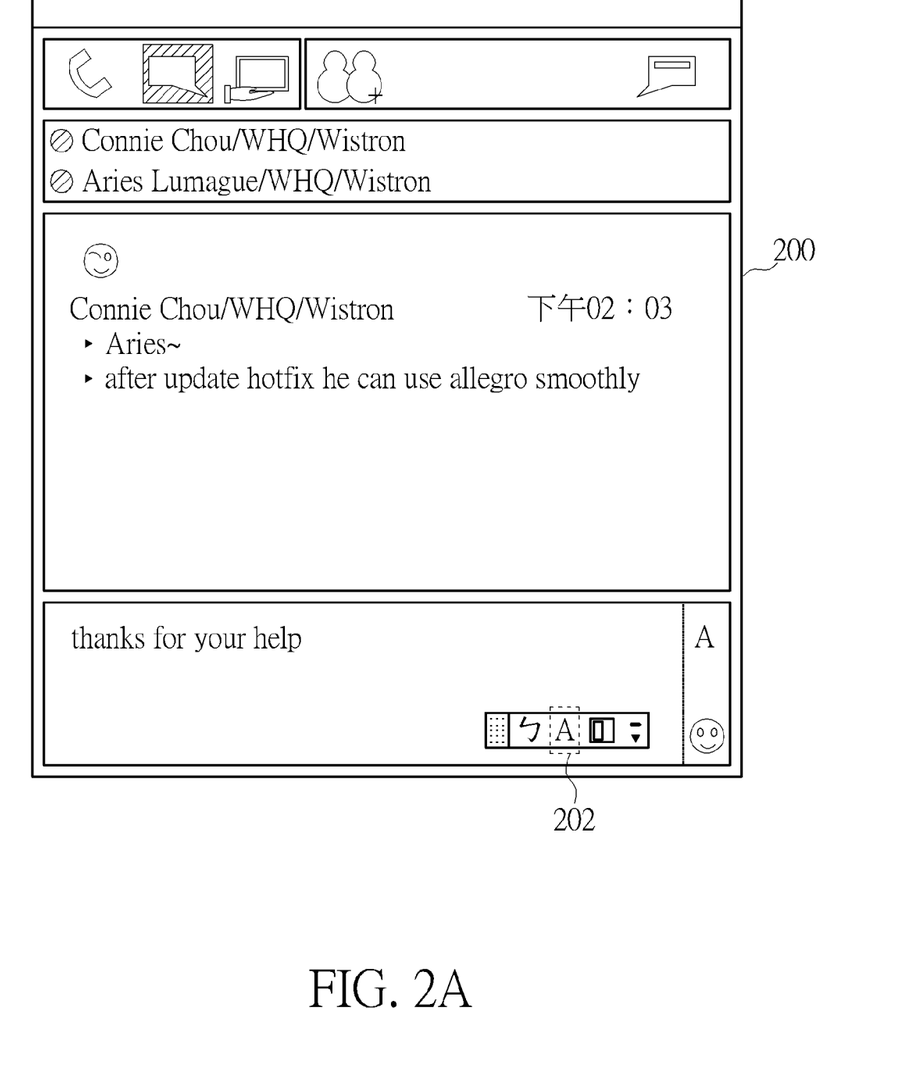
FIG. 2A to FIG. 2C are schematic diagrams of display images according to an embodiment of the present disclosure.
Figure 2B:
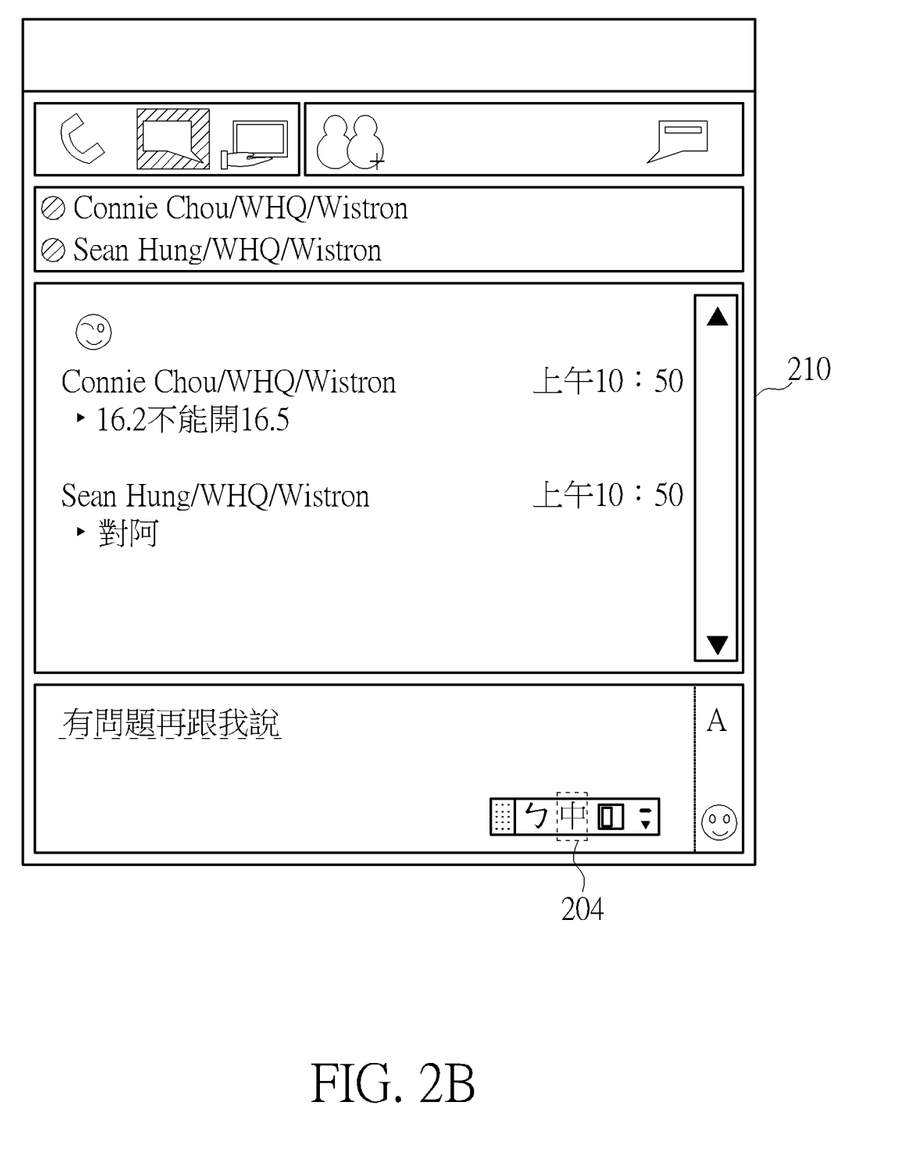
Figure 2C:
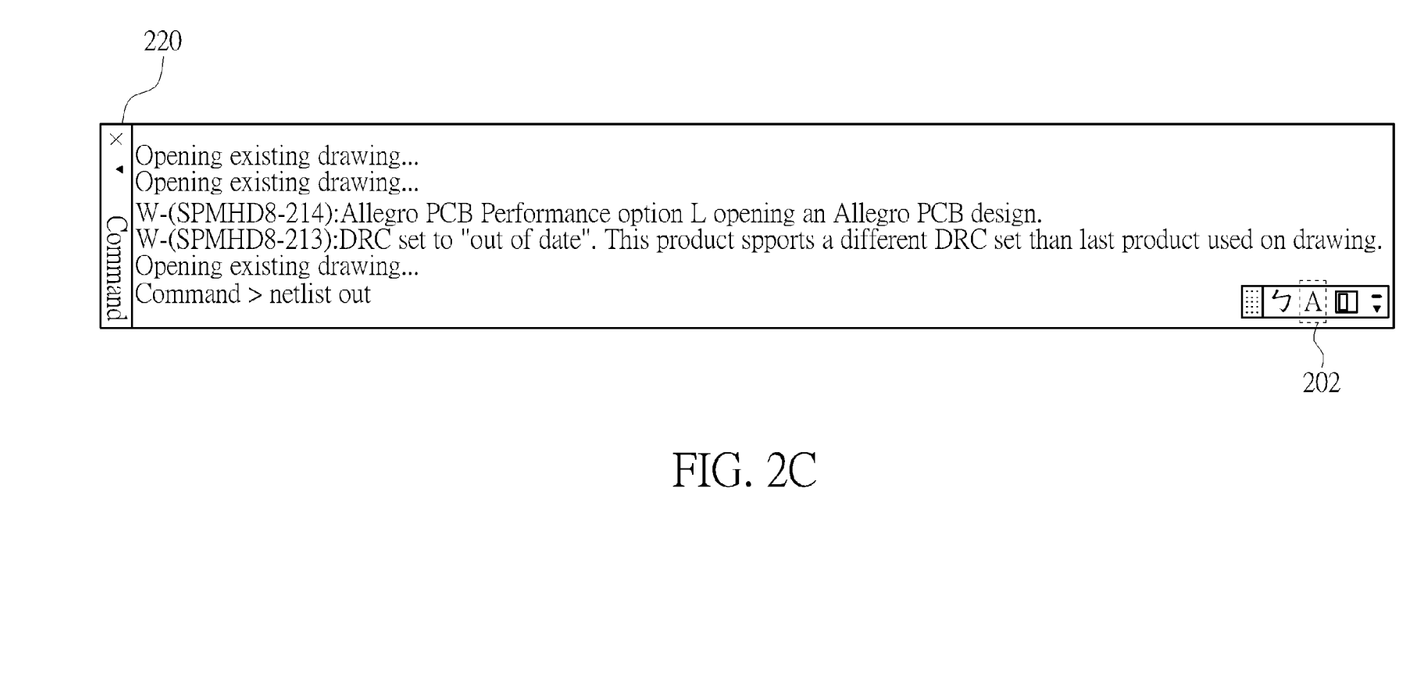

Please refer to FIG. 2A to FIG. 2C, which are schematic diagrams of display images 200, 210 and 220, respectively, according to an embodiment of the present disclosure. As shown in FIG. 2A, the display image 200 is a dialog box, in which the dialog content includes mainly English words. The processing unit 104 therefore determines that the English word count is greater than the traditional Chinese word count in the display image 200, and automatically switches the input method to an English/numeral mode 202. In other embodiments, the processing unit 104 may also directly enable an English/numeral input method; this is not limited herein. As shown in FIG. 2B, the display image 210 is a dialog box, in which the dialog content includes mainly traditional Chinese words. The processing unit 104 therefore determines that the traditional Chinese word count is greater than the English word count in the display image 210, and automatically switches the input method to a traditional Chinese mode 204. As shown in FIG. 2C, the display image 220 is a program writing window, in which all program codes are written in English and Arabic numerals. The processing unit 104 therefore determines that all words in the display image 200 are English and Arabic numerals, and no traditional Chinese word is included. In such a situation, the processing unit 104 automatically switches the input method to the English/numeral mode 202.

Figure 3:
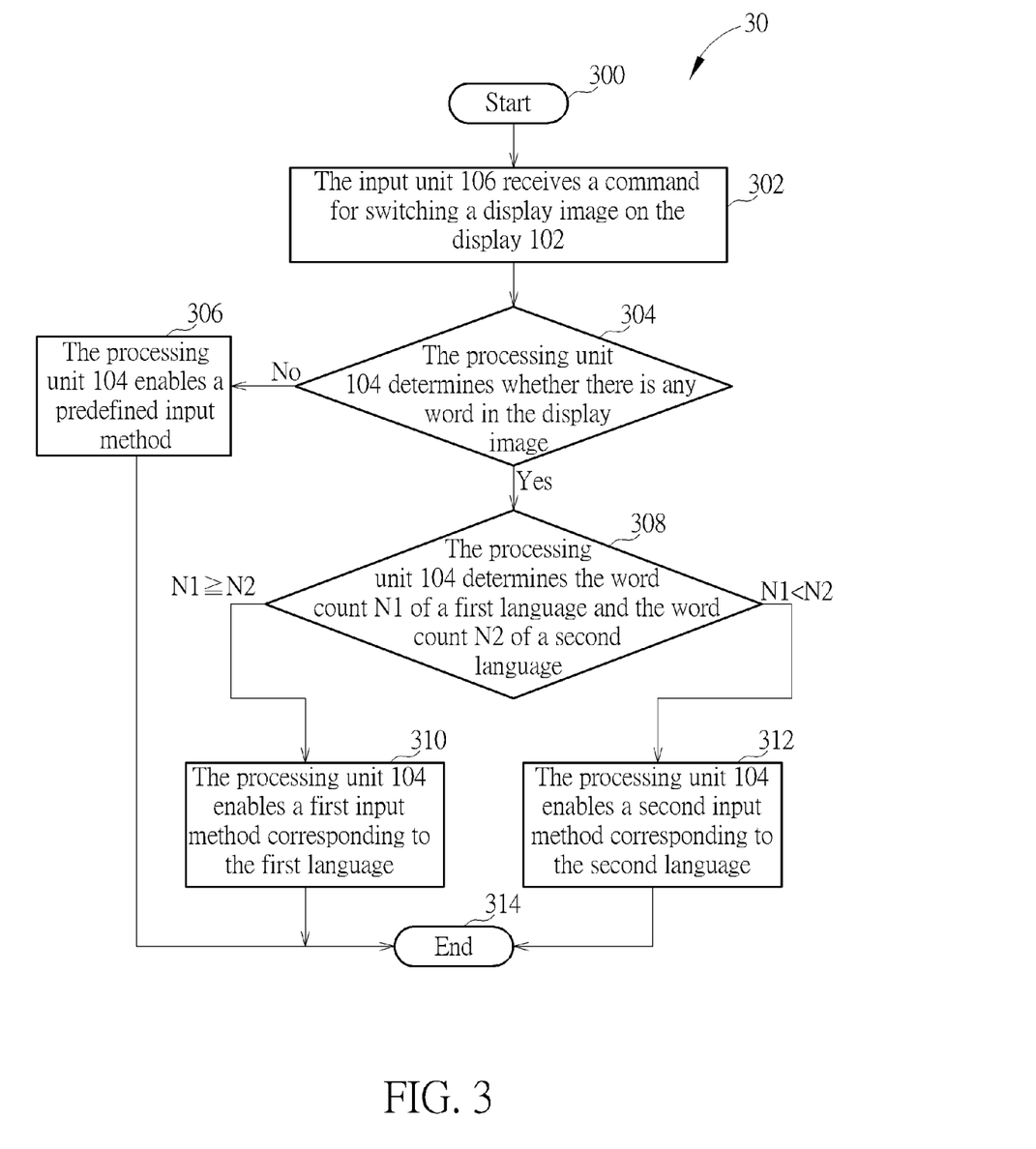
FIG. 3 is a schematic diagram of an input method providing process 30 according to an embodiment of the present disclosure.

Please refer to FIG. 3, which is a schematic diagram of an input method providing process 30 according to an embodiment of the present disclosure. As shown in FIG. 3, the input method providing process 30, which may be utilized in the electronic device 10 shown in FIG. 1, includes the following steps:

Step 300: Start.

Step 302: The input unit 106 receives a command for switching a display image on the display 102.

Step 304: The processing unit 104 determines whether there is any word in the display image. If yes, go to Step 308; otherwise, go to Step 306.

Step 306: The processing unit 104 enables a predefined input method.

Step 308: The processing unit 104 determines the word count N1 of a first language and the word count N2 of a second language. When the word count N1 of the first language is greater than or equal to the word count N2 of the second language, go to Step 310; when the word count N2 of the second language is greater than the word count N1 of the first language, go to Step 312.

Step 310: The processing unit 104 enables a first input method corresponding to the first language.

Step 312: The processing unit 104 enables a second input method corresponding to the second language.

Step 314: End.

According to the input method providing process 30, the languages used by the user 110 include the first language and the second language; hence, the processing unit 104 performs determination on the word count N1 of the first language and the word count N2 of the second language. In Step 302, the input unit 106 receives a command from the user 110 to switch the image on the display 102. Please note that the command inputted by the user 110 for switching the image on the display 102 may be an instruction for switching from one window to another or an instruction for opening a new window. For a smart phone or tablet, switching between different display images may be performed when the user 110 uses different applications.

In Step 304, the processing unit 104 determines whether there is any word in the display image. Since each display image may only contain words of a language used by the user 110 most frequently, each display image may correspond to an input method. In such a situation, the processing unit 104 only needs to perform word determination after the display image is switched, and then enables the proper input method. In other words, in the same display image, the user 110 may usually continue to use the same input method to perform input; hence, the processing unit 104 may not need to perform word determination, so that the input method may not need to be switched and another input method may not be enabled when the display image does not change. In some situations, there may be no words in the display image after the user 110 switches the display image (especially when the user 110 opens a new window). In such a condition, since the processing unit 104 cannot determine the word count of any language, the user 110 may select a language as a predefined language. The processing unit 104 may enable a predefined input method corresponding to the predefined language (Step 306), wherein the predefined input method may be the first input method or the second input method. For example, if the language used by the user 110 most frequently is traditional Chinese and the input method used by the user 110 most frequently is the phonetic symbol input method, traditional Chinese may be set to be the predefined language and the phonetic symbol input method may be set to be the predefined input method. When there is no word detected after the display image is switched, the processing unit 104 may automatically enable the phonetic symbol input method. As a result, in most conditions, the user 110 may use the phonetic symbol input method to input words without manually switching the input method.

Please note that the range of the abovementioned display image may be part of the image or the whole image on the display 102; this is determined based on requirements of the user 110. For example, if the display image corresponds to a window opened by the user 110, the range of the display image may include the whole window or include an area for writing words in the window. When the display image is the area for writing words in the window, the processing unit 104 may determine the word counts of various languages in the area for writing words in the window. If the display image corresponds to an application, the range of the display image may include an area displaying the executed application on the display 102. At this moment, the processing unit 104 may determine the word counts of various languages in the area where the application is executed. In the electronic device 10, the user 110 may zoom out or zoom in the window, so that the range of the display image may vary with the window. The user 110 may arbitrarily define the range of the display image on the display 102 according to his/her requirements; the definition of the display image is not limited herein.

After the user 110 switches the display image, if there are words in the display image, the processing unit 104 performs determination on the word count N1 of the first language and the word count N2 of the second language (Step 308). When the word count N1 of the first language is greater than or equal to the word count N2 of the second language, the processing unit 104 may enable the first input method corresponding to the first language (Step 310); when the word count N2 of the second language is greater than the word count N1 of the first language, the processing unit 104 may enable the second input method corresponding to the second language (Step 312). In an embodiment, all words in the display image may correspond to a single language. For example, if all words in the display image correspond to the first language, the word count N2 of the second language will be equal to 0. In such a situation, the processing unit 104 may enable the first input method corresponding to the first language. If all words in the display image correspond to the second language, the word count N1 of the first language will be equal to 0. In such a situation, the processing unit 104 may enable the second input method corresponding to the second language.

In general, the determination criterion of the processing unit 104 is finding the language having the highest word count in the display image and enabling the corresponding input method. In such a condition, when the word count N1 of the first language is greater than the word count N2 of the second language, the processing unit 104 enables the first input method; and when the word count N2 of the second language is greater than the word count N1 of the first language, the processing unit 104 enables the second input method. Please note that, in this embodiment, when the word count N1 of the first language is equal to the word count N2 of the second language, the processing unit 104 enables the first input method. In other embodiments, the processing unit 104 may also enable the second input method when the word count N1 of the first language is equal to the word count N2 of the second language. In practice, the user 110 may define the priority of each input method according to personal requirements when there are two or more languages both having the highest word count. The processing unit 104 may select to enable the input method corresponding to the language with the highest priority among those languages having the highest word count.

Please note that the word count may be calculated according to the characteristics of each language/word. For example, for determination of the word count in English, a proper method is to divide different words according to spaces between words, and then calculate the word count accordingly; the number of letters is not considered as the word count. For determination of the word count in traditional Chinese or simplified Chinese, the number of Chinese characters is considered as the word count. For determination of the word count in Japanese, the numbers of hiragana characters and katakana characters are combined to be the word count. The processing unit 104 may also combine word numbers of Arabic numerals and English words to calculate and determine the word count corresponding to the English/numeral input method. The processing unit 104 may also uniquely calculate the word count of Arabic numerals. The calculation method of the word counts maybe determined according to requirements of the user 110, and is not limited herein.

In an embodiment, the user 110 may use multiple kinds of input methods to input words in the same language. For example, both the phonetic symbol input method and 'Cangjie' input method can be used for inputting words in traditional Chinese. The user may predefine the phonetic symbol input method or the 'Cangjie' input method as the input method corresponding to traditional Chinese according to the user's preferred input method. When the user predefines the phonetic symbol input method as the input method corresponding to traditional Chinese, when the language having the highest word count in the display image is traditional Chinese, the processing unit 104 may enable the phonetic symbol input method; and when the user predefine the 'Cangjie' input method as the input method corresponding to traditional Chinese, when the language having the highest word count in the display image is traditional Chinese, the processing unit 104 may enable the 'Cangjie' input method. In practice, the user 110 may only need to predefine one of the Chinese input methods as the input method corresponding to traditional Chinese.

Please note that the present disclosure provides a method capable of determining the language/word the user wants to input in the display image and enabling the corresponding input method according to the word counts in the display image. Those skilled in the art can make modifications and alternations accordingly. For example, in the above embodiment shown in FIG. 2, the processing unit 104 performs word count determination between two languages/words, but in other embodiments, the user 110 may input words in more than two different languages in the electronic device 10, and the processing unit 104 should determine a language having the highest word count among these languages in order to enable the corresponding input method.

Please note that, in the context of this disclosure, a non-transitory computer-readable medium stores programs for use by or in connection with an instruction execution system, apparatus, or device. The non-transitory computer-readable medium may embody a program executable in an electronic device such as the mobile device 10 shown in FIG. 1. In accordance with such examples, the program comprises code for receiving a command for switching a display image of the electronic device, code for determining whether at least two words correspond to at least two languages when at least the two words are in the display image, code for determining a word count of a first language and a word count of a second language when the two words correspond to the two languages, and code for enabling a first input method corresponding to the first language when the word count of the first language is greater than the word count of the second language, and code for enabling a second input method corresponding to the second language when the word count of the second language is greater than the word count of the first language. Other alternations related to the abovementioned methods may also be compiled to the program executable in the electronic device.

The abovementioned computer-readable medium can be any medium that can contain, store, or maintain the program described herein for use by or in connection with the instruction execution system. The computer-readable medium may comprise any type of physical media such as magnetic, optical, or semiconductor media. More specific examples of a suitable computer-readable medium may include, but are not limited to, a magnetic tape, a magnetic floppy diskette, a magnetic hard drive, a memory card, a solid-state drive, a USB flash drive, an optical disc, a RAM including a static random access memory (SRAM), a dynamic random access memory (DRAM) and a magnetic random access memory (MRAM), a ROM including a programmable read-only memory (PROM), an erasable programmable read-only memory (EPROM), an electrically erasable programmable read-only memory (EEPROM), or other type of memory device.

In the prior art, when switching between windows or applications in the electronic device, the user should manually enable a desired input method, which is inconvenient. A user may forget to switch the input method when switching the window, and therefore use a wrong input method to input words, resulting in the user having to delete the words, which causes more wasted time. In comparison, the present disclosure provides a method of providing input method and an electronic device using the same, which is capable of calculating word counts corresponding to various languages in a display image and finding which language has the highest word count, in order to determine in which language the user needs to input words and enable the corresponding input method. In this way, under most conditions, the user may perform word input without manually switching the input method.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A method of providing an input method for an electronic device, the method comprising:
   receiving a command for switching a display image of the electronic device from a first image to a second image;
   determining whether at least two words correspond to at least two languages when at least the two words are in the display image, wherein the two words are already in the second image when the display image is switched;
   determining a word count of a first language and a word count of a second language when the two words in the second image correspond to the two languages; and
   enabling a first input method corresponding to the first language when the word count of the first language is greater than the word count of the second language, or enabling a second input method corresponding to the second language when the word count of the second language is greater than the word count of the first language.

2. The method of claim 1, further comprising:
   setting the first language as a predefined language and enabling the first input method corresponding to the first language when there is no word in the display image.

3. The method of claim 1, further comprising:
   enabling a third input method corresponding to a third language when all words in the display image are words of the third language.

4. The method of claim 1, further comprising:
   enabling the first input method corresponding to the first language or enabling the second input method corresponding to the second language when the word count of the first language is equal to the word count of the second language.

5. The method of claim 1, wherein the word count of the first language is calculated by determining that different words of the first language are separated by a space.

6. The method of claim 1, wherein the first language is English and the first input method is an English/numeral input method, and the second language is traditional Chinese and the second input method is a phonetic symbol input method or a Cangjie input method.

7. The method of claim 1, wherein the step of receiving the command for switching the display image of the electronic device comprises:
   switching a window to another window on a display corresponding to the electronic device or opening a window on the display.

8. The method of claim 1, further comprising:
   enabling a fourth input method corresponding to a fourth language when there are words of the fourth language in the display image and a word count of the fourth language is greater than the word count of the first language and the word count of the second language.

9. An electronic device, comprising:
   a display;
   a processing unit;
   an input unit, coupled to the display and the processing unit, for receiving a command for switching a display image on the display from a first image to a second image; and
   a storage unit, coupled to the display and the processing unit, for storing a program executed by the processing unit for performing the following steps:
      determining whether at least two words correspond to at least two languages when at least the two words are in the display image, wherein the two words are already in the second image when the display image is switched;
      determining a word count of a first language and a word count of a second language when the two words in the second image correspond to the two languages; and
      enabling a first input method corresponding to the first language when the word count of the first language is greater than the word count of the second language, or enabling a second input method corresponding to the second language when the word count of the second language is greater than the word count of the first language.

10. The electronic device of claim 9, wherein the program further instructs the processing unit to set the first language as a predefined language and enable the first input method corresponding to the first language when there is no word in the display image.

11. The electronic device of claim 9, wherein the program further instructs the processing unit to enable a third input method corresponding to a third language when all words in the display image are words of the third language.

12. The electronic device of claim 9, wherein the program further instructs the processing unit to enable the first input method corresponding to the first language or enable the second input method corresponding to the second language when the word count of the first language is equal to the word count of the second language.

13. The electronic device of claim 9, wherein the word count of the first language is calculated by determining that different words of the first language are separated by a space.

14. The electronic device of claim 9, wherein the first language is English and the first input method is an English/numeral input method, and the second language is traditional Chinese and the second input method is a phonetic symbol input method or a Cangjie input method.

15. The electronic device of claim 9, wherein the input unit switches a window to another window on the display or opens a window on the display to switch the display image on the display when receiving the command.

16. The electronic device of claim 9, wherein the program further instructs the processing unit to enable a fourth input method corresponding to a fourth language when there are words of the fourth language in the display image and a word count of the fourth language is greater than the word count of the first language and the word count of the second language.

17. A non-transitory computer-readable medium embodying a program executable in an electronic device for instructing a processor to perform a method of providing an input method, the program comprising:
   code for receiving a command for switching a display image of the electronic device from a first image to a second image;
   code for determining whether at least two words correspond to at least two languages when at least the two words are in the display image, wherein the two words are already in the second image when the display image is switched;
   code for determining a word count of a first language and a word count of a second language when the two words in the second image correspond to the two languages; and
   code for enabling a first input method corresponding to the first language when the word count of the first language is greater than the word count of the second language, and code for enabling a second input method corresponding to the second language when the word count of the second language is greater than the word count of the first language.

18. The non-transitory computer-readable medium of claim 17, wherein the program further comprises:
   code for setting the first language as a predefined language and enabling the first input method corresponding to the first language when there is no word in the display image.

19. The non-transitory computer-readable medium of claim 17, wherein the program further comprises:
   code for enabling a third input method corresponding to a third language when all words in the display image are words of the third language.

20. The non-transitory computer-readable medium of claim 17, wherein the program further comprises:
   code for enabling the first input method corresponding to the first language or enabling the second input method corresponding to the second language when the word count of the first language is equal to the word count of the second language.

21. The non-transitory computer-readable medium of claim 17, wherein the word count of the first language is calculated by determining that different words of the first language are separated by a space.

22. The non-transitory computer-readable medium of claim 17, wherein the first language is English and the first input method is an English/numeral input method, and the second language is traditional Chinese and the second input method is a phonetic symbol input method or a Cangjie input method.

23. The non-transitory computer-readable medium of claim 17, wherein the code for receiving the command for switching the display image of the electronic device comprises:
   code for switching a window to another window on a display corresponding to the electronic device or opening a window on the display.

24. The non-transitory computer-readable medium of claim 17, wherein the program further comprises:
   code for enabling a fourth input method corresponding to a fourth language when there are words of the fourth language in the display image and a word count of the fourth language is greater than the word count of the first language and the word count of the second language.

* * * * *